UNITED STATES PATENT OFFICE.

ANTHONY PIRZ AND MANUEL PIRZ, OF EAST NEW YORK, N. Y.

IMPROVEMENT IN THE MANUFACTURE OF ACETIC ACID.

Specification forming part of Letters Patent No. 87,365, dated March 2, 1869.

*To all whom it may concern:*

Be it known that we, ANTHONY PIRZ and MANUEL PIRZ, of East New York, in the county of Kings and State of New York, have invented certain new and useful Improvements in the Method of Manufacturing Acetic Acid, or rather of obtaining acetic acid from acetate of lime; and we do hereby declare the following to be a full and exact description thereof.

We take acetate of lime and treat it with water and sulphuric acid, in quantities chemically required and well known in this manufacture, to eliminate or set free the acetic acid. The mass will now be in the ordinary condition of a paste.

Now, to extract the liquid acid from the said paste, we subject it cold to mechanical forces, such as pressure, either by a press, air or water, or steam.

We prefer to employ a powerful press or the water-pressure, and have invented a press peculiarly adapted to this purpose; but we do not esteem this peculiar device or machine absolutely essential.

We can carry out our invention by simply inclosing a quantity of the paste in a suitable cloth, and subject it to a strong pressure in any ordinary screw-press or hydraulic press, or analogous device. The acid will escape through the interstices in the cloth, and may be gathered in a suitable receptacle below, while the sulphate of lime remaining, after being treated with additional water to extract the remaining acid, may be dried and sold for agricultural or other purposes.

We can apply the mechanical force requisite to separate the acid from the pasty mass by means of centrifugal force, air-pump, or any other approved means.

Whatever the means through which the requisite mechanical force is applied, it is necessary that it shall be applied in sufficient intensity and allowed to act for a sufficient time to extract nearly all the acid.

The water in which the refuse is leached is used to reduce to a paste a succeeding quantity of acetate of lime. The acid escapes in an impure but highly limpid condition. It may be subsequently purified in any ordinary way. By this means we can obtain a sufficiently pure acetic acid for nearly all purposes.

We wish it understood that the impure acid obtained by our process with mechanical force may be afterward rectified in any ordinary way, or used without rectification.

Having now fully described our invention, what we claim as new, and desire to secure by Letters Patent, is—

The within-described method of extracting acetic acid from acetate of lime in a cold way by means of pressure, as press, air, water, and steam pressure, centrifugal power, or air-pump.

In testimony whereof we have hereunto set our names in presence of two subscribing witnesses.

ANT. PIRZ.
M. PIRZ.

Witnesses:
H. A. P. KASYER,
JOHN MAYER.